United States Patent [19]

Brown

[11] 3,825,903

[45] July 23, 1974

[54] AUTOMATIC SWITCHING OF STORAGE PROTECT KEYS

[75] Inventor: Wendell W. Brown, Boca Raton, Fla.

[73] Assignee: International Business Machines Corporation, Armonk, N.Y.

[22] Filed: Apr. 30, 1973

[21] Appl. No.: 356,015

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,328,768 | 6/1967 | Amdahl et al. | 340/172.5 |
| 3,576,544 | 4/1971 | Cordero et al | 340/172.5 |
| R27,251 | 12/1971 | Amdahl et al. | 340/172.5 |

OTHER PUBLICATIONS

Capowski, R. et al., "Storage Protect Mechanism with Reference and Change Recording," IBM Technical Disclosure Bulletin, Vol. 14, No. 12, May 1972, pp. 3584–3585.

*Primary Examiner*—Raulfe B. Zache
*Attorney, Agent, or Firm*—Earl C. Hancock; Carl W. Laumann, Jr.; J. Janun, Jr.

[57] ABSTRACT

Storage protect keys are placed in a register in correlation to blocks of main storage. Initialization of a problem program is accompanied by selection of one of these registers via the high order bits of the first instruction to be executed. The key is stored in a separate store and thereafter compared against the key retrieved from the register addressed by the high order bits of each subsequent instruction. Failure to compare indicates a storage boundary has been crossed and an unauthorized instruction execution is being attempted.

8 Claims, 4 Drawing Figures

AUTOMATIC SWITCHING OF STORAGE PROTECT KEYS

CROSS REFERENCE TO RELATED APPLICATION

Application Ser. No. 194075 filed Oct. 27, 1971 and entitled, "Data Acquisition and Control System" by M. I. Davis, J. M. Loffredo, P. L. Rickard and L. E. Wise and assigned to the same assignee as this application describes a virtual processor system environment in which the present invention can be easily adopted for use.

BACKGROUND OF THE INVENTION

1. Field of the Invention

This invention relates to the central processing unit of data processing equipments. More particularly, this invention is concerned with apparatus for protecting storage locations in the main storage used in conjunction with a central processing unit from unauthorized operations. Although not limited thereto, this invention is particularly useful in the interrupt priority level driven virtual processor environment similar to that discussed in detail in the cross-referenced application of Davis et al.

2. Description of the Prior Art

It is often necessary in the operation of a central processing unit or CPU of a computer to prevent certain instructions from being executed relative to defined areas of its main storage. For instance, critical programs may be stored within certain predefined locations or blocks of locations in an addressable main storage and any inadvertent attempt to write in those storage locations while executing a problem program could result in disastrous loss of data or programs.

A typical prior art approach to providing such storage protect keys is to assign a special bit in each storage as a protect key. This bit is set by a supervisory program and is inspected each time the location is addressed by a problem program. A logical decision is then made as to whether or not the operation is permitted. Yet another prior art approach is to build a memory of unique keys each associated with the identification of a particular program. These keys are then retrieved from this additional memory and compared against the keys associated with storage blocks to determine whether or not the protected operation is to be permitted. U.S. Pat. No. 3,377,624, "Memory Protection System," by Nelson et al which issued Apr. 9, 1968 and is assigned to the same assignee as this application illustrates such an approach. In the Nelson et al arrangement, storage protect keys are retrieved based upon the program identification from a control memory. These keys are inspected and each bit corresponds to a protected function. That is, the key obtained by program identification might employ a single bit which, if set, would permit writing for that particular program in the addressed block of storage.

Another arrangement for building storage key arrays to be used in a multiprocessor system is shown in the IBM TECHNICAL DISCLOSURE BULLETIN of June 1971 at pages 109 - 110 (Volume 14, No. 1) in the article entitled "Storage Protect Key Array for a Multiprocessor System" by Alvarez et al. In the Alvarez et al article, the key array is used to indicate whether or not the program being executed in the multiprocessor organization has been placed in a local storage buffer. Thus, the loading of a storage buffer is accompanied by the loading of an address correlated key in a table. During subsequent instruction executions, if the key associated with the instruction does not match the key contained in the key array, an interrupt must be taken to load the local storage with the appropriate data.

3. Summary of the Invention

The present invention avoids the necessity of building separate storage protect key tables with program identification correlated therewith. It also provides a means for having an effective storage protect key operation without requiring separate storage protect key allocations within each instruction format of the programs thereby reducing demands upon the main storage as well as reducing software overhead burden. Storage protection is provided by this invention to protect the contents of specified areas of main storage from unauthorized operations caused by erroneous execution of a problem program. This protection is achieved by assigning keys to predetermined blocks of storage locations. The key assigned to the blocks of storage containing the first instruction to be executed by a given program is transferred to a separate register. As each potentially protected instruction is subsequently executed by that program, this separate register is compared with the key stored in association with the block of main storage locations then being addressed by the program. The detection of a mismatch causes the access to be suppressed and a protection exception is recognized. Thus each program can be assigned a different protection key or the same protection key can be intermingled amongst programs. In any event, this key must match the storage key assigned to that program's blocks of storage or a protection key exception will occur.

In a priority level driven virtual processor organization such as is implemented in the IBM System/7 and described in the referenced Davis et al, application, changes from one problem program to a new problem program are effected by means of program control or by hardware control due to interrupts. When an interrupt occurs, the new problem program is initiated automatically; therefore, the protection key must be changed to correspond with the new program storage key. Following the prior art teachings, the solution to this problem is to provide a register in a high speed buffer for each of the possible sublevels on all interrupt levels in the system. Such an approach requires an excessive number of register positions and data manipulations. This invention substantially reduces the number of registers and software burden needed for storage key protection.

In a partitionable multipriority level driven processor environment, this invention can be implemented using only one protection key register for each interrupt level. The protection key register for a given level is set automatically during the first instruction fetch cycle following an interrupt. The protection register is set to the same value as the storage key associated with the segment of main storage containing the instruction being executed. Thus, the protection key associated with a given program is initially set into the register positions associated with blocks of storage permitted for the particular program so that the hardware automatically retrieves this key and retains it for each instruction execution during the course of execution of the program. The initial storage fetch cycle thereby effectively defines the storage protect key to be used for execution of that program. Accordingly, if the problem program during its execution attempts to perform a prohibited operation relative to a block of main storage having a storage protect key different from that which was associated with the initial instruction fetch cycle for that program, a failure to compare with the storage protect key will result and the operation is prevented. The invention is adaptable for selecting any or all of the operations to be prohibited such as writing, reading or the like.

Apparatus in accordance with the present invention permits supervisory program intervention to change the storage key to be used as desired. It can recognize special storage protect keys which will allow any writing in the associated block of main storage which special protect key would typically only be employed by supervisory programs. An additional protect key can be employed which will allow any program to perform the protected operation in its storage location.

The apparatus in accordance with this invention includes a register for each block of main storage which can be preloaded with special storage protect keys. The apparatus further responds to each interrupt initiation to transfer the storage protect key contained in the aforementioned register into a separate storage protect key register. As each instruction of the program following the interrupt is retrieved for execution, the storage key from the key protect register is then compared against the contents of the additional register. A failure to compare indicates that an execution of an instruction beyond the permitted boundaries is being attempted and an error indicated. In a virtual processor organization such as is discussed in the Davis et al, application, a separate storage key protect register can be associated with each of the interrupt levels so that it is retained as the interrupt shifts amongst priorities in processing.

Accordingly, it is a primary object of the present invention to provide a highly flexible storage protect operation for a data processing unit.

A further object of the present invention is to provide a storage protect operation in a central processor environment wherein minimal register requirements are demanded for verifying the allowability of instructions during execution.

Yet another object of this invention is to provide storage protect operations for a multiple priority level interrupt driven virtual processor organization.

The foregoing and other objects, features and advantages of the present invention will be apparent from the following more particular description of the preferred embodiment of the invention as it is illustrated in the accompanying drawings.

DETAILED DESCRIPTION OF PREFERRED EMBODIMENTS

Figure 1:
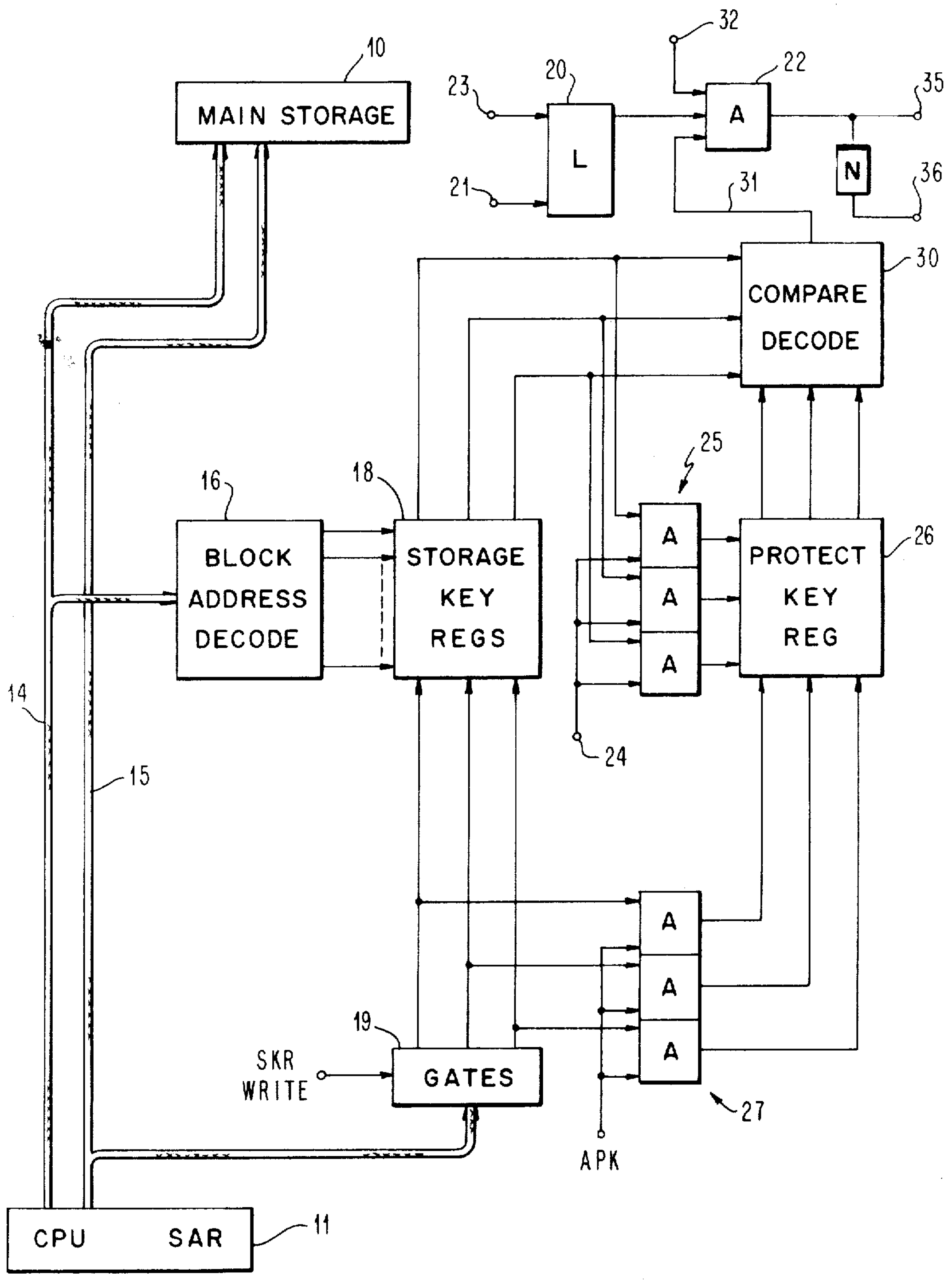
FIG. 1 is a logic block diagram showing the interrelationship of the present invention relative to well known central processing unit elements.

As shown in FIG. 1, main storage 10 is a well-known addressable main storage device used in conjunction with state of the art central processing units and this storage is addressed by information contained in the central processing unit storage address register CPU SAR 11. As illustrated, the high order bits of the address are presented on multiconductor connection 14 while the low order bits of this storage address are present on multiconductor connection 15. The composite of the bits present on connections 14 and 15 thereby represents an address of a storage location in 10. The data bus connections into storage 10 are not shown since they are not essential to a full understanding of the present invention. The high order bits present on conductors 14 are decoded as a block address by decoder 16 to select one of a plurality of storage key registers 18.

The storage key registers 18 are initialized from a supervisory type of program which generates a storage key register write instruction SKR Write which is introduced to gate 19. Thus the block defined by the high order bits on conductors 14 selects one of the storage key registers 18 and the low order bits on SAR 11 are then gated into the selected register 18. Immediately. prior to storing storage protect keys in register 18, latch 20 is cleared by a signal on terminal 21 so that no storage protect check signal or apparent error condition will be reflected at the output of AND 22.

The FIG. 1 embodiment is shown with three bits of data being introduced to registers 18 for defining the storage protect keys but it will be understood that greater or lesser numbers of bits can be employed as desired. Completion of the loading of registers 18 is then followed by a signal at terminal 23 setting protect latch 20 so that AND 22 is partly conditioned to detect an attempt to perform an unauthorized operation in a storage block. Execution of an application program is preceded by an instruction fetch cycle which presents an address to storage 10 over conductors 14 and 15. Commencement of this instruction fetch cycle is recognized by the CPU which generates a command signal at input 24 thus partly conditioning AND circuits 25. By this means, the particular storage key associated with the main storage block being addressed is gated through AND circuits 25 into the protect key register 26. Completion of the instruction fetch cycle causes input 24 to be removed so that the register 26 will not be changed under normal circumstances during the execution of the application program. As each block address is decoded by decoder 16, the appropriate storage key register 18 will be gated as one input to comparator/decoder 30. Comparator 30 then compares the storage key from register 18 with the protect key register 26 contents and produces a signal on line 31 if these two items do not favorably compare. This provides the second conditioning input for AND 22. At any point during the execution of the application program wherein the execution might cause an operation that is potentially protected, a signal is produced at input terminal 32 thus completing the conditioning inputs to AND 22. With all three inputs to AND 22 being present, an output signal is produced at terminal 35 indicating that the intended operation is not authorized. Conversely, a failure to complete conditioning of AND 22, can be detected at terminal 36 indicating the operation intended to be performed is authorized.

For instance, it may be desired to prevent the application program from writing into a particular block of storage. If this were the case, the block of storage being addressed as detected by decoder 16 will produce an output from the selected register 18 that will not compare with the originally loaded protection key from register 26. Therefore the signal on line 32 will cause an output at terminal 35 indicating that the operation is prohibited. An interrupt can then be taken by the processor or other corrective action instituted. Occasionally it may be necessary to change the contents of protect key register 26. For instance, execution of an application program may be interrupted by a controlling supervisory program. When this occurs, the protect key register may require setting to a key more appropriate for the supervisor. Execution of an alter protect key instruction APK thus conditions the inputs to AND circuits 27. By placing an appropriate sequence of low order bits in SAR 11, the contents of register 26 can be selected via gates 19, an SKR Write instruction and an APK instruction which energizes AND 27. By placing all zeroes in conductors 14, no changes would be made to any of registers 18. If desired, the contents of register 26 can be read out and stored by means not shown to preserve its contents at the point that the application program is interrupted for execution of another program. The loading of register 26 when control of the CPU is to be returned to the application program from the intervening program can be performed in the same manner as mentioned before.

Figure 3:
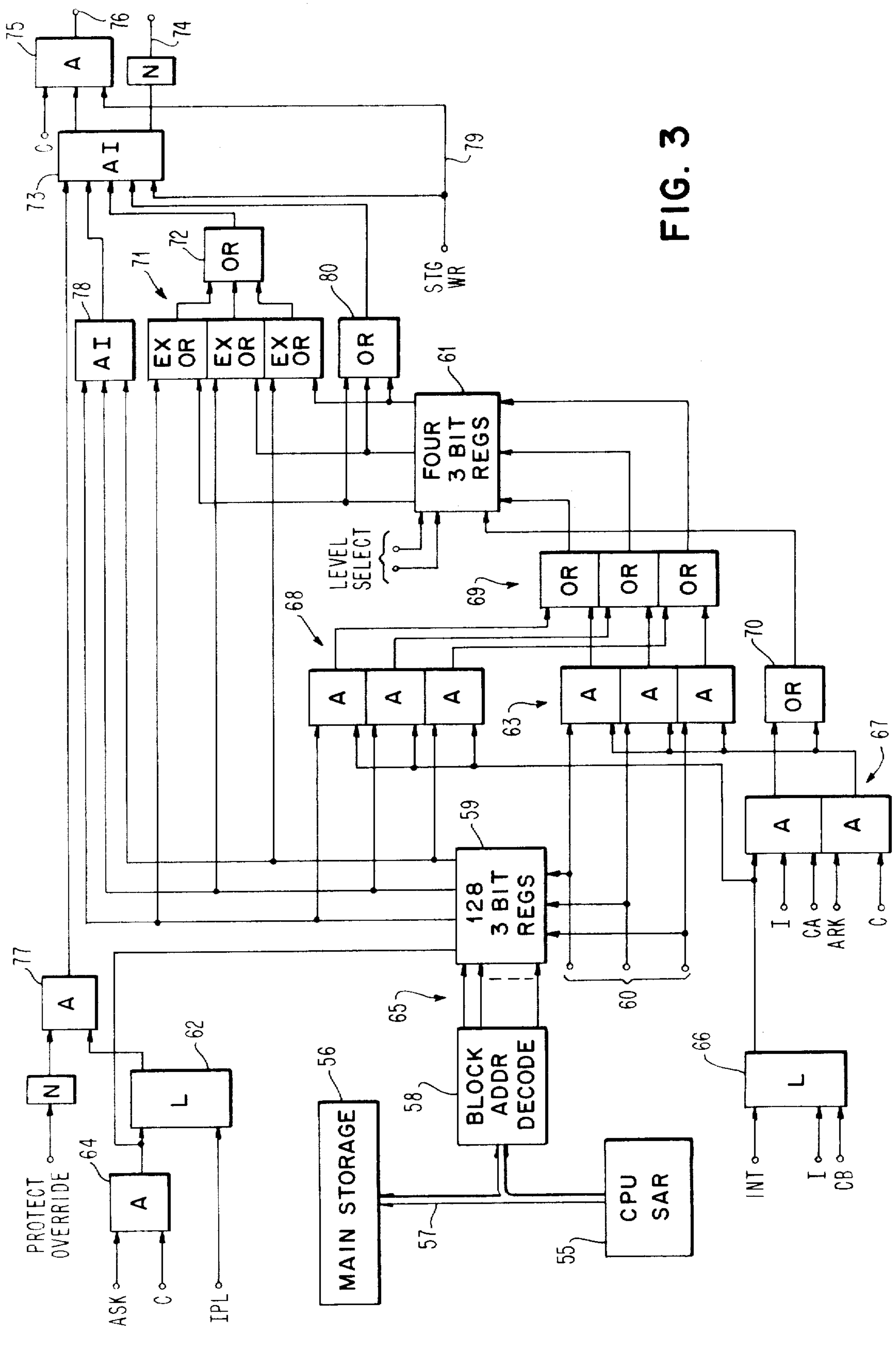
FIG. 3 shows the logic circuitry in accordance with the present invention for providing multiple priority level storage key protect operation along with implementation of special storage key protect functions.

As will be more fully appreciated from the detailed description of FIG. 3, compare/decode circuit 30 in FIG. 1 can be arranged to provide an output for other than direct storage key and protect key comparisons. A special protect key which authorizes writing or reading from any storage location can be used and circuit 30 can recognize its presence to force an output 31 even though this protect key in register 26 does not compare with the output of registers 18. Conversely, a storage location may be eligible for accepting or performing the operation regardless of the specific protect key associated with the program execution. Thus a unique weighted key in one of registers 18 could also cause a forced output 31 when decoded by circuit 30 despite the lack of a comparison with the output of register 26. It should be appreciated that the present invention permits prohibition of any of a variety of operations relative to a particular block of storage 10 and is not necessarily restricted to protection against unauthorized reading, writing or other functions relative to data or programs stored in a given block. Although FIG. 1 is illustrated showing the inputs for gate 19 as originating from the low order bits of the storage address from register 11, it will be understood that the input for gates 19 could be obtained from other sources such as the CPU data bus.

The storage protect in accordance with this invention is similar in result obtained to prior art storage protection such as is used on the IBM System 360. Each time a storage access is performed, the contents of the storage key register logically associated with the block of storage containing the storage location addressed are compared with the contents of the protect key register associated with the currently active program. If a protected storage write operation is being performed and the contents of the two registers are different, a protection check condition occurs. The storage write operation is inhibited and the machine branches to an error handling routine.

A brief description of the automatic level and sub-level used in an interrupt driven multiple priority level processor such as is used on the IBM System/7 will help emphasize the unique aspects of the present invention. Such a system has the capability of switching to a high priority interrupt level without software assistance at the request of an external stimulus (interrupt request). In addition, it selects one of a multiplicity of different possible programs or program entry points to be executed on the selected level without software assistance. The prior art approaches would suggest that each of these programs be assigned a different storage key. Therefore, many protect key registers are apparently required for each of the levels if the system is to maintain its ability to change levels and select programs (sub-levels) and maintain storage protection capability without software assistance.

The embodiment described hereinafter maintains the ability for a computer to change interrupt levels and select programs while providing storage protection with only one protect key per level rather than one per each program (sub-level). This is accomplished by detecting when an interrupt level switch has occurred. During the instruction fetch cycle of the first instruction executed after the level switch, the contents of the storage key register associated with the storage block addressed replaces the contents of the protect key register on this currently active level. The contents of the protect key register are now compared with the contents of the storage key register on all following storage accesses and storage protection is maintained without software assistance. Further, the contents of the protect key register for an interrupted program execution on a given level are merely retained in isolation until the interrupted program is resumed.

Figure 2:
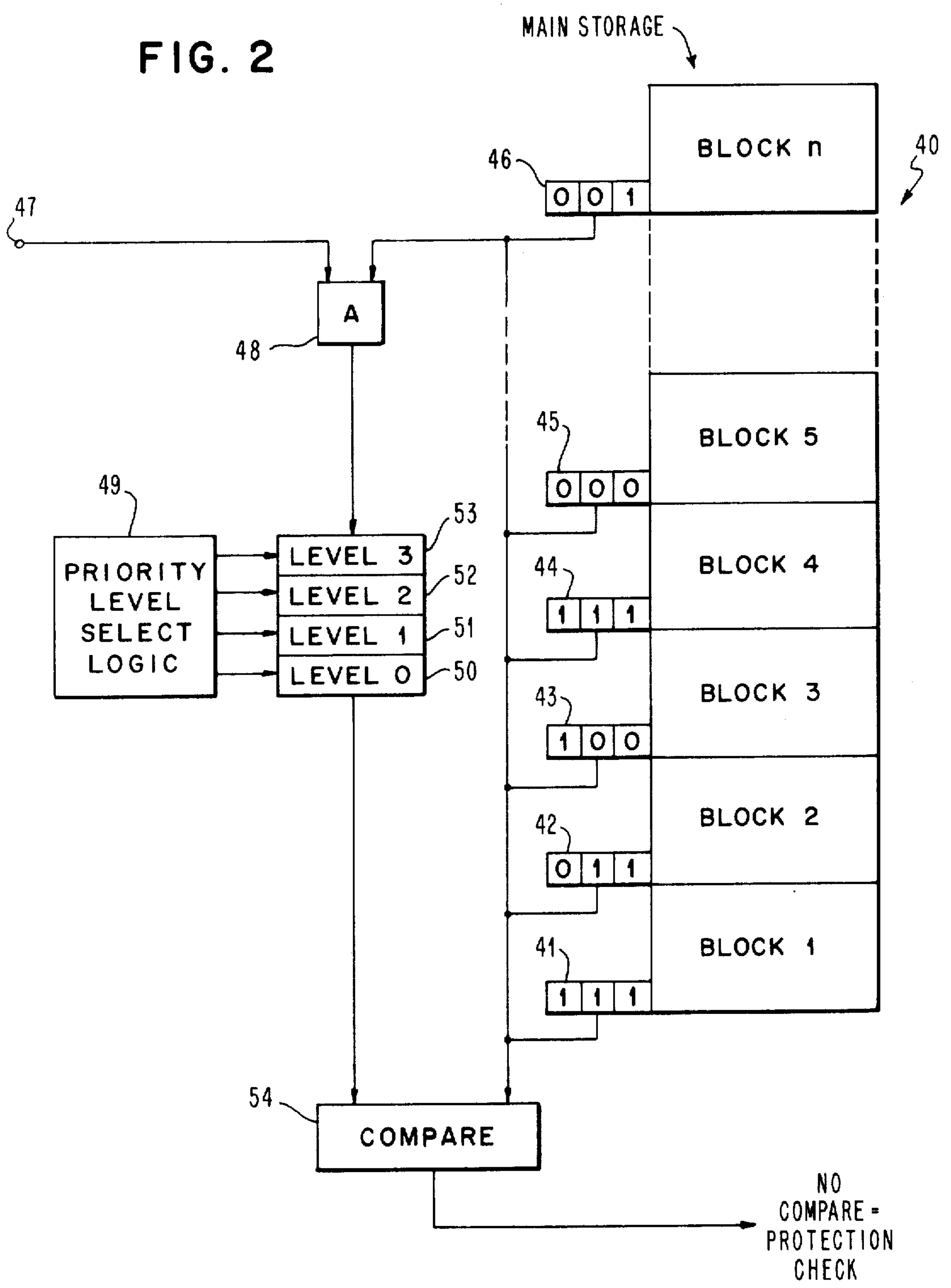
FIG. 2 illustrates an arrangement for implementing the present invention in the environment of a multiple priority level driven virtual processor organization.

FIG. 2 shows a somewhat idealized block diagram of a manner of implementing the present invention in the environment of a CPU having multiple levels of priority interrupt processing. Such a multilevel priority oriented processor is shown in application Ser. No. 194075 entitled "Data Acquisition and Control System" by Davis, et al, which application is assigned to the same assignee as this application. Main storage 40 is shown segmented into a series of discreet blocks 1-N each of which has a storage key register 41–46 associated therewith. Registers 41–46 are comparable to storage key registers 18 of FIG. 1 and are initially loaded with key correlated data such as is illustrated by way of example in FIG. 2. These keys are loaded prior to execution of an application program. Whenever an interrupt level change is detected in the multilevel priority processor organization such as is shown in the Davis, et al, application, an input is provided at terminal 47 thereby partially conditioning AND 48. The level oriented processor includes priority level selecting logic 49 which is effective to actuate one of the protect key registers 50–53 with each of these registers corresponding to a priority level of the processor. That is, level 0 register 50 corresponds to the highest priority of interrupt processing possible whereas level 3 register 53 corresponds to the lowest priority level. As is understood from the Davis, et al, application, the presence of an interrupt change and the level of that interrupt is recognized by the processor and thus the appropriate register 50–53 will be initially loaded by the contents of a storage key register 41–46 as a function of the particular storage block in main storage 40 that is addressed by the initial instruction fetch cycle for performing the subroutine to process the interrupt. After this initial loading of registers 50–53, one of those registers (the one with the highest priority) will be continuously active via selection logic 49 so as to provide input from this active register to compare circuit 54. As each storage block is referenced or addressed by the execution of the application program, its storage key will be compared against the protection key register associated with the level of interrupt being processed. A failure to compare will cause a protection check in a manner similar to that mentioned for FIG. 1.

FIG. 3 is a detailed logic block diagram of the operating environment for the present invention as implemented in such a multiple level priority interrupt handling processor. The exemplary embodiment shown in FIG. 3 uses CPU storage address register 55 to address main storage 56 via multiconductor bus 57 in the well-known manner. The higher order bits of this address are introduced to block address decoder 58 which interprets this address portion to select one of the storage key registers 59. In the example shown, registers 59 are noted as including 128 registers which are each 3 bits wide. Input 60 provides the 3 bits to be loaded into either storage key registers 59, multiple level protect key registers 61 or both. Input 60 could be obtained from the lower order bits of SAR 55 output as mentioned for FIG. 1 or could be obtained from another source such as the main processor data bus.

Loading of registers 59 is initiated by an initial program load instruction IPL which clears latch 62. This prevents any apparent protect key violation during initial loading. An alter storage key instruction ASK along with a clock pulse C is introduced to AND 64 to enable registers 59 to receive the 3 bit bytes present at input 60. During an initial program load sequence, the IPL reset input resets latch 62 which is maintained in that state until one of the registers is loaded thus preventing the setting of latch 62 until the storage protect feature has been initialized. For 128 registers, 7 bits of the high order bit positions on output 57 of SAR 55 are required by decoder 58 to select one of its 128 outputs 65. Note that each one of registers 59 would compare to a respective one of registers 41–46 shown in FIG. 2. Under these circumstances, main storage 40 in FIG. 2 is subdivided into 128 blocks which can be any desired size.

After registers 59 have received appropriate storage protect keys for the associated main storage block, the processor is conditioned to handle subsequent interrupts. Appearance of an interrupt signal INT as an input will set latch 66, INT having been produced by the CPU. The set output of latch 66 partially conditions AND circuit 67 and all of AND circuit 68. The handling of an instruction fetch cycle is reflected by input I which also partially conditions AND 67. The instruction being fetched will have an address present on 57 with the high order bit thereof selecting one of registers 59. The content of the particular register 59 selected is thus introduced to respective sections of AND circuits 68 thus providing the input for protect key register 61 via OR circuits 69. The particular level of priority which is active by this new interrupt is reflected by an appropriate CPU originated selection at the level selection input LVL SEL input to registers 61. Accordingly, one of the four 3 bit registers 61 corresponding to the new interrupt level is loaded with the key contents from the selected register 59. This selection is actually effected by an initial clock pulse during the instruction fetch cycle I as shown as the CA input to AND 67 thereby providing a strobing input to the selected register 61 through OR 70. A subsequent cycle CB during the instruction cycle I will cause latch 66 to be cleared.

Thereafter, each instruction which is recognized by the CPU as attempting to perform an operation which might be protected, results in a comparison of the current protection key as reflected by the selected output of registers 59 against the active interrupt level correlated register 61. This comparison function is performed in exclusive OR circuit 71. That is, if any one of OE circuits 71 has inputs which differ, it will provide a positive level to OR 72 which then provides yet another positive level as one input to AI 73. If all other inputs are positive, positive output 74 is produced indicating that a protection check operation should be taken. Thus if any inputs to AI 73 are negative reflecting a successful comparison, AND 75 will produce an output in response to a clock C pulse at terminal 76 indicating the function can be performed in the processor.

As particularly illustrated in FIG. 3, the storage protection function intended to be provided is a WRITE protect. That is, the circuit is intended to prevent an application program which is retrieved from a particular block of storage from destroying the contents of any location in another block which is not authorized. This is reflected by the storage write STG WRITE input to AND 75 and AI 73 which reflects the attempt by the instruction execution to perform a storage write operation. If this write function is authorized, then an output will be produced at 76 and the operation can proceed. Another conditioning input for AI 73 is provided by the output of AND 77. AND 77 is conditioned whenever protect latch 62 has been set indicating that the processor is operating in the protection mode and also whenever there is no protection override signal being provided. This protection override can be employed for various functions such as some supervisory programming execution, manual data loading into storage such as from a console, cycle stealing operations, data transfers from another processor or the like. The protected operation may be intended to be permitted for any application execution in selected blocks of main storage 56. The circuitry of FIG. 3 is arranged to accommodate this operation by inclusion of the inverting AND circuit 78. Any block which is thus intended not to be protected would be pre-loaded with a protect key of all one's. When this block is addressed, the all one inputs to AI 78 from the selected register 59 will cause AI 78 to produce a negative output thereby deconditioning AI 73. Accordingly, AI 73 will condition AND 75 so that the authorizing output 76 will be produced in response to the concurrence of clock C and the input at line 79 reflecting the attempt to perform the protected operation in the processor. That is, output 76 will be produced regardless of whether or not a successful comparison has been produced by exclusive OR circuits 71. Similarly, there may be occasions when the potentially protected operation is to be permitted for a program execution regardless of the state of the protect key associated with a given block. By introducing all zeroes to the particular one of registers 61 for performing this operation, OR circuit 80 will produce a negative level out and decondition AI 73 under these circumstances. Again this means that the conditioning output for AND 75 will be provided regardless of the OE 71 comparison and the authorizing signal 76 will be produced instead of the protect violation reflecting positive signal 74.

Note that, when storage write protection is being provided, the setting of storage protect latch 62 while the storage key registers 59 are being loaded is immaterial since the retrieving of these particular bytes of information from storage for loading into registers 59 will not result in any attempt to perform a storage WRITE operation. However, when the present invention is to be used for both storage write and read protection, it may be necessary to provide a protect override input into AND 77 thereby deconditioning AND 73 and preventing any apparent error during this loading process.

Figure 4:
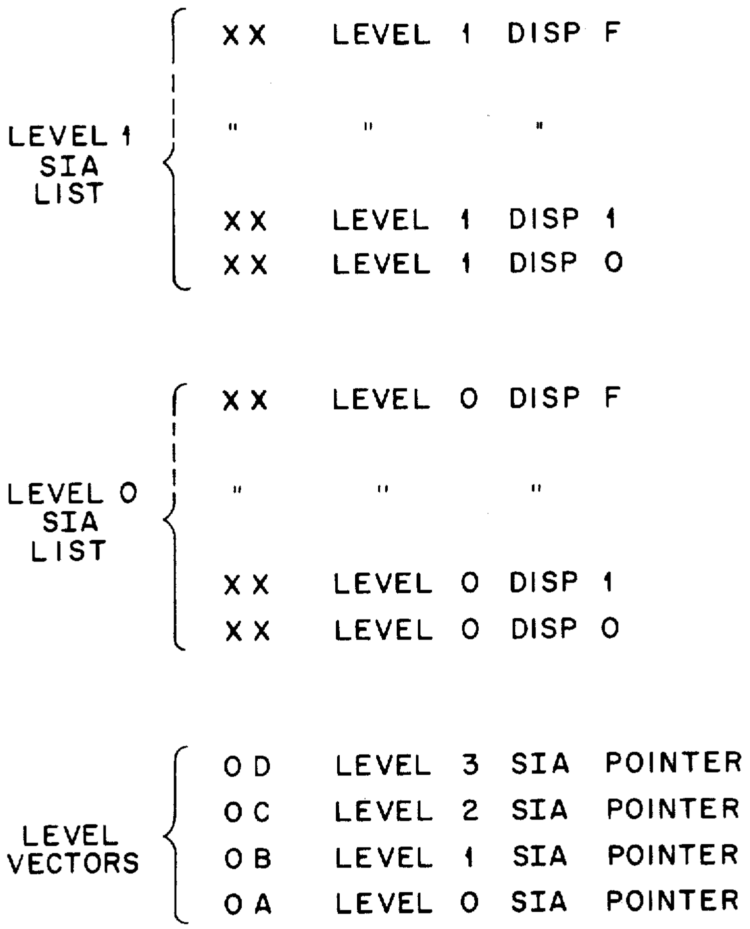
FIG. 4 contains an idealized arrangement of storage locations which might be addressed in operation of circuitry in accordance with the present invention.

FIG. 4 shows a somewhat simplified diagram of part of the main storage contents for use in an interrupt priority level and sublevel handling apparatus such as that shown in the referenced Davis, et al, application in FIG. 5 thereof. The appearance of an interrupt on a higher level than that currently being processed will cause the processor to automatically reference one of the level vectors stored in locations OA–OD. These level vectors provide start instruction address SIA pointers to define the area of storage wherein the various sublevel addresses are contained. As shown in FIG. 3, the vector level address is placed on SAR 55 but the FIG. 3 circuitry provides no further response since no instruction fetch cycle is initiated. The level vector is combined with the sublevel displacement to provide the address XX of the particular storage location containing the starting address for the programming subroutine to handle this specific interrupt. What has now been retrieved is the starting address of the first instruction of the servicing subroutine for this particular interrupt and it is placed on SAR 55 during an instruction fetch cycle. The circuitry of FIG. 3 thereafter is effective as described hereinbefore to perform the protection checking operation for each attempt to execute an instruction which might be protected. The supervisory program by means not shown can be permitted to read the contents of any or all of protect key register 61 which can then be used to identify the user or reload the key later if a pre-empting function is to be performed.

Although the invention has been particularly described and shown relative to the foregoing embodiments, it will be understood by those having normal skill in the art that various other changes, additions and embodiments may be made without departing from the spirit of this invention.

What is claimed is:

1. Apparatus for a central processing unit which executes programs in conjunction with an addressable main storage comprising
   - a plurality of first registers each assigned to a predetermined block of locations in said main storage,
   - means for loading said first registers with bytes of information,
   - a second register,
   - means responsive to the initial instruction fetch for a program execution by said central processing unit for transferring the contents of the one of the said first registers assigned the block of storage containing said instruction to said second register, and
   - means responsive to subsequent instructions addressing said main storage for comparing said second register with the contents of the one of the said first registers assigned to the block of storage locations addressed by said subsequent instructions,
   - whereby failure of said comparing means to produce an indication of a favorable compare reflects an attempt by the instruction then being executed to perform an operation prohibited relative to the said block of storage locations addressed by the said subsequent instruction.

2. Apparatus in accordance with claim 1 which further includes
   - logic means responsive to a special byte in any of said first registers for producing an output indicative that a said subsequent instruction operation is to be permitted regardless of said comparing means output.

3. Apparatus in accordance with claim 1 which further includes
   - means for transferring a byte from said central processing unit to said second register, and
   - logic means responsive to a special byte in said second register for producing an output indicative that a said subsequent instruction operation is to be permitted regardless of said comparing means output.

4. Apparatus in accordance with claim 1 wherein said central processing unit is capable of handling multiple programs each having a priority level assigned thereto with control means permitting the said program having the highest said priority at any given time to operate said central processing unit, said apparatus further including
   - a plurality of said second registers each corresponding to a respective priority level, and
   - means responsive to said central processing unit control means for causing said comparing means to operate with the said second register corresponding to the priority level of the program being permitted to operate by said control means while retaining all other said second registers in their previous state.

5. Apparatus for a central processing unit having an addressable main storage and means for producing bytes of information composed of high order bits and low order bits comprising
   - a plurality of first registers each assigned to a predetermined block of locations in said main storage,
   - means responsive to said high order bits for selecting one of said first registers,
   - means responsive to execution of an initializing instruction by said central processing unit for gating said low order bits into the selected one of the said first registers selected by said high order bits,
   - a second register,
   - means responsive to the first instruction of a program about to be executed by said central processing unit for transferring the contents of the said first register selected by said high order bits responsive means to said second register, means responsive to subsequent instructions for the said program for comparing the one of the said first registers selected by said high order bits responsive means with said second register, and logic means responsive to said comparing means output for indicating that the operation intended by one of the said subsequent instructions is prohibited.

6. Apparatus in accordance with claim 5 wherein said logic means includes means responsive to a special byte in the said first register selected by said high order bit responsive means for preventing production of said prohibited operation indicating signal.

7. Apparatus in accordance with claim 5 which further includes means responsive to a controlling instruction from said central processing unit for transferring a special byte to said second register, and said logic means being responsive to said special byte in said second register for preventing production of said prohibited operation indicating signal.

8. Apparatus in accordance with claim 5 wherein said central processing unit executes programs having priority levels assigned thereto with control means interrupting execution of a program having a given priority level in favor of executing a program having a higher priority level, said apparatus further including a plurality of said second registers each assigned a respective said priority level, and means responsive to said control means for allowing said comparing means to compare (*a*) the one of the said first register selected by said high order bits in the instruction currently being executed with (*b*) the said second registers assigned the same priority level as the program currently being executed.

* * * * *